United States Patent
Siala

(10) Patent No.: US 6,674,740 B1
(45) Date of Patent: Jan. 6, 2004

(54) ITERATIVE RAKE RECEIVER AND CORRESPONDING RECEPTION PROCESS

(75) Inventor: Mohamed Siala, Clamart (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/373,626

(22) Filed: Aug. 13, 1999

(30) Foreign Application Priority Data

Aug. 20, 1998 (FR) .......................................... 98 10578

(51) Int. Cl.$^7$ ............................................... H04B 7/216
(52) U.S. Cl. ....................... 370/342; 370/334; 370/441; 370/479
(58) Field of Search ................................ 370/203, 206, 370/310, 328, 335, 342, 431, 441, 464, 479; 375/130, 136, 137, 140–145, 147, 149, 150

(56) References Cited

U.S. PATENT DOCUMENTS

| | | | | | |
|---|---|---|---|---|---|
| 5,442,661 | A | * | 8/1995 | Falconer | 370/479 |
| 5,590,409 | A | * | 12/1996 | Sawahashi et al. | 370/342 |
| 5,671,221 | A | * | 9/1997 | Yang | 370/320 |
| 6,215,814 | B1 | * | 4/2001 | Ylitalo et al. | 370/335 |
| 6,424,644 | B1 | * | 7/2002 | Siala et al. | 370/335 |

FOREIGN PATENT DOCUMENTS

| | | |
|---|---|---|
| EP | 0 676 874 | 10/1995 |
| EP | 0 748 074 | 12/1996 |
| EP | 0 756 391 | 1/1997 |
| GB | 2 311 702 | 10/1997 |
| WO | WO 96/37054 | 11/1996 |
| WO | WO 97/05709 | 2/1997 |

OTHER PUBLICATIONS

R. Price, et al., Proceedings of the IRE, pp. 555–570, "A Communication Technique for Multipath Channels", 1958.

A. P. Dempster. et al., Roy. Stat. Soc. Journal, vol. 39, pp. 1–21, "Maximum Likelihood From Incomplete Data Via the *EM Algorithm*", 1977.

* cited by examiner

Primary Examiner—Hassan Kizou
Assistant Examiner—David Odland
(74) Attorney, Agent, or Firm—Oblon, Spivak, McClelland, Maier & Neustadt, P.C.

(57) ABSTRACT

A CDMA radiocommunication signals receiver for receiving signals obtained from spectrum symbols spread using pseudo-random sequences and having been propagated along a number of paths. The receiver includes a filter configured to restore L unspread signals for each symbol, corresponding to L different paths, a calculating circuit configured to calculate L estimates of the L different paths, and a demodulator configured to process each of the L unspread signals using the corresponding L estimates to obtain L path contributions. Also included is an adder configured to form a sum of the L path contributions and for outputting an estimate of a received symbol, and a decision circuit configured to make a decision about a value of the received symbol based on a value of the estimate of the received symbol output by the adder. Further, the receiver processes blocks of N symbols, each block having data symbols and control symbols, each symbol being identified by a rank k that it occupies in the block, where k varies from 0 to N−1. Also, for each path identified by an index l, where l varies from 0 to L−1, and for each block, the receiver considers a vector $C_l$ with N components that characterizes the path during the block, and the receiver defines a vector base $B_K$, vectors of the vector base $B_K$ being N eigenvectors of the matrix $E[C_l C_l^T]$, each vector $C_l$ being decomposed in the vector base, where decomposition coefficients denoted $G_{lK}$ form independent random Gaussian variables. In addition, coefficients $G_{lK}$, define a vector $G_l$ with N components for each path l, and the calculating circuit estimates each vector $G_l$, using an iterative process based on EM estimation-maximization algorithm based on a maximum a posteriori probability criterion.

6 Claims, 5 Drawing Sheets

ITERATIVE RAKE RECEIVER AND CORRESPONDING RECEPTION PROCESS

BACKGROUND OF THE INVENTION

1. Field of the Invention

The purpose of this invention is an iterative rake receiver and a corresponding reception process. It is used in radiocommunications applications and more particularly in the Code Division Multiple Access (CDMA) technique. It may be applied to the system defined by the IS'95 standard and in third generation UMTS and IMT-2000 systems.

2. Discussion of the Background

In the CDMA technique, information symbols that are to be transmitted do not directly modulate a carrier, but are firstly multiplied by pseudo-random sequences (or codes) which have the effect of spreading their spectrum. On reception, the received signal is unspread by filtering adapted to the sequence used in transmission (or by correlation) and is then demodulated.

This technique enables several users to use the same radiocommunications channel, provided that a particular sequence is assigned to each.

A multipath channel is generally used, in the sense that the radio-electric wave propagates along several different paths between the place of transmission and the place of reception. Therefore, the receiver does not receive a single signal for each transmitted information symbol, but it receives several more or less delayed and more or less modified copies. In order to reliably restore the transmitted information, the largest possible number of these copies has to be taken into account and they have to be recomposed in the receiver.

One way of doing this was to design a special receiver, called a rake receiver, in the sense that it "rakes" information at different instants symbolizing the teeth of the rake. This type of receiver separates signals corresponding to different paths and includes several "teeth" or "branches" or "pins", each of which processes one of these signals. The signal is unspread and demodulated in each tooth. The next step is to recompose all signals in an adder.

A rake receiver was initially described by R. PRICE and P. E. GREEN in an article entitled "A Communication Technique for Multipath Channels" published in the "Proceedings of the IRE", vol 46, March 1958, pp 555–570.

There is also a description of this receiver in the general book by J. G. PROAKIS entitled "Digital Communications", $3^{rd}$ edition, MCGRAW-HILL, 1995, (third edition) 1989, (second edition).

FIG. 1 attached diagrammatically shows a receiver of this type. As shown, this receiver comprises a main input E, a filter 10 with a width adapted to the signal spreading band, L means $12_0, \ldots, 12_l, \ldots, 12_{L-1}$ of restoring L signals unspread in frequency corresponding to L paths (these means usually include a filter adapted to one of the pseudo-random sequences used in transmission or a correlator and means of searching for signal peaks), L means $14_0, \ldots, 14_l, \ldots, 14_{L-1}$ of estimating the characteristics of the L paths used by the various signals, L demodulation means $16_0, \ldots, 16_l, \ldots, 16_{L-1}$ combining the unspread signals and estimate of paths, an adder 18 adding the N contributions output by the N demodulators, and finally a decision circuit 20 that outputs transmitted or reference symbols on a general output S in order to test the communication.

After a strong demand from services requiring ever increasing throughputs, the frequency spreading band of CDMA systems is continuously being increased. This increase in the band is accompanied by a continuous increase in the number of paths received at the receiver. For a given received power, this increase in the number of paths tends to reduce the power received per path and therefore to reduce the global quality of the channel estimate. Consequently, a constructive combination of contributions from these paths to the receiver is rarely guaranteed and can result in a severe loss of transmission quality.

Since CDMA systems are inherently limited by multiple access interference, this loss of performance cannot be compensated by increasing the power. Furthermore, a solution involving an increase in the number of pilot symbols would reduce the system capacity.

The purpose of this invention is to correct this disadvantage.

SUMMARY OF THE INVENTION

The main purpose of this invention is to increase the performances of CDMA systems by improving the reception quality for a given transmitted power, and therefore with an unchanged level of multiple access interference. This quality improvement can increase the capacity and coverage of the CDMA system. This improvement is obtained by optimizing operation of the receiver in the classical case of slow fading, but also in the more difficult case of very fast fading.

Another purpose of the invention is to facilitate the construction of terminals by making them much less sensitive to inaccuracies in the local oscillator used to transpose the received signal in the base band.

CDMA systems introduce the concept of a power control period (PCP). The power of the signal emitted by the transmitter remains constant during each of these periods but it can vary from one power control period to the next in order to compensate for slow fading (due to the distance and mask effects), and fast fading due to multipath effects when the terminal is moving slowly. Furthermore, control symbols are used in addition to symbols transporting information. The invention can reduce the relative number and/or power of these control symbols, for an equal reception quality. This objective is achieved by taking optimum account of control symbols for an arbitrary number of consecutive power control periods in the channel estimate. It is also achieved by taking account of control symbols (if any) included in the pilot channels of some CDMA systems in the optimal channel estimate, in the absence of matching antennas. It is also achieved by taking account of control symbols (if any) assigned to other users in the down link in the estimate, still in the absence of matching antennas. Finally, it is achieved by taking optimum account in the estimate of this channel of all or some of the data symbols for these power control periods which are obviously more numerous and often contain more energy than the control symbols. The reduction in the number and/or the power of the control symbols is a way of consolidating the encoding of useful data and increasing the proportion of the transmitted power allocated to these data.

With the invention, the optimum channel estimate can also take account of control symbols multiplexed in time and control symbols multiplexed on in-phase and/or in-quadrature components of the modulated signal.

All power control period symbols can be used with the invention. Thus, shifts in the local oscillator frequency can be monitored and corrected, even if control symbols are grouped together.

According to the invention, block by block processing is carried out every time that the received signal corresponding to a given number of power control periods is available. Like a conventional rake receiver, it always begins by unspreading the signals corresponding to significant paths selected for the final combination. It then makes an approximate estimate of the multipath channel by using control symbols associated with the received block only. This estimate is a way of characterizing the variation in the phase and the amplitude of each path during the block to be processed, for each symbol in the block, symbol by symbol. The receiver according to the invention demodulates and then combines the estimated path contributions and outputs a sample (or weighted output) for each data symbol contained in the block.

In the case of a conventional rake receiver, these weighted outputs are used directly to detect and decode transmitted data symbols. These outputs have a certain reliability with respect to values taken on by the data symbols sent during a block. In the case of the receiver according to the invention, they may be used in addition to the control symbols, to provide an improved estimate of.each received path. This improved estimate of the multipath channel may be optimized, possibly tanking account of the encoded structure of the data symbols. Taking account of the correcting encoding results in better quality of the weighted outputs at the receiver.

The weighted outputs obtained at the end of a given iteration may be used again, together with control symbols, to provide an additional improvement to the channel estimate. This improved estimate then improves the quality of the weighted outputs generated by the receiver. Therefore, the receiver output is looped back onto the estimating means.

The optimum nature of the receiver according to the invention is related to the nature of the estimate of the multipath channel. This optimum nature depends firstly on the use of an iterative Estimation-Maximization (EM for short) type algorithm to construct the most likely channel, as a function of the received block. For example, this algorithm is described in the article by A. P. DEMPSTER, N. M LAIRD and D. B RUBIN entitled "Maximum Likelihood from Incomplete Data via the EM Algorithm", published in the Roy.Stat.Soc journal, Ser. 39, 1977.

The optimum estimate for the channel also depends on the decomposition of each path received according to an expansion algorithm called the KARHUNEN-LOEVE algorithm. This decomposition enables flexible characterization of time variations of paths due to the oppler effect and can easily be included in the EM lgorithm itself. For example, the KARHUNEN-LOEVE lgorithm is described in the book by J. G. PROAKIS entioned above, 1989 version, pages 340–344.

More precisely, the purpose of this invention is a CDMA radiocommunication signals receiver, these signals having been obtained from spectrum symbols spread using pseudo-random sequences, these signal then having been propagated along a number of paths, this receiver comprising:
means of restoring L unspread signals for each symbol, corresponding to L different paths,
means of calculating L estimates of the L paths,
demodulation means for processing each of the L unspread signals using the L corresponding estimates to obtain L path contributions,
an adder to form the sum of these L contributions and to output an estimate of the received symbol,
a decision circuit about the received symbol starting from the value of the estimate output by the adder,
this receiver being characterized in that:
a) it processes blocks of N symbols, each block comprising data symbols and control symbols, each symbol being identified by the rank k that it occupies in the block, where k varies from 0 to N−1,
b) for each path identified by an index l, where l varies from 0 to L−1, and for each block, the receiver considers a vector $C_l$ with N components that characterizes the path during this block,
c) the receiver comprises means of defining a vector base $B_k$, these vectors being N eigenvectors of the matrix $E[C_l C_l^{*T}]$, each vector $C_l$ being decomposed in this base, the decomposition coefficients denoted $G_{lk}$ forming independent random Gaussian variables,
d) coefficients $G_{lk}$, defining a vector $G_l$ with N components for each path l, the estimating means being capable of estimating each vector $G_l$, using an iterative process based on EM estimation-maximization algorithm based on a maximum a posteriori probability criterion.

In a particular embodiment, the output from the adder is looped back onto the estimating means, the estimating means being used initially making use of control symbols contained in the block and assumed to be known, so that a first estimate of the data symbols contained in the block can be obtained from the output of the adder, the estimating means then using all estimated symbols present at the output from the adder and so on, the estimating means finally outputting the optimum value of $G_l$ (l=0, 1, . . . , L−1), after a final iteration.

Another purpose of this invention is a process for reception of CDMA type of radiocommunication signals, these signals having been obtained from spectrum symbols spread using pseudo-random sequences, these signals then having been propagated along a number of paths, this reception process comprising the following operations:
for each symbol, L unspread signals corresponding to L different paths are restored,
L estimates of the L paths are calculated,
each of the L unspread signals is demodulated using the L corresponding estimates to obtain the L contributions of the paths,
the sum of these L contributions is formed, which gives an estimate of the received symbol,
a decision is made about the received symbol, based on the value of the estimate obtained,
this process being characterized in that:
a) blocks of N symbols are processed, each block comprising data symbols and control symbols, each symbol being identified by rank k that it occupies within the block, where k varies from 0 to N−1,
b) for each path, identified by an index l where l varies from 0 to L−1, and for each block, a vector $C_l$ with N components is considered, which characterizes the path during this block,
c) the matrix $E[C_l C_l^{*T}]$ which has N eigenvectors denoted $B_k$ is considered, and these N eigenvectors $B_k$ are used as a base, each vector $C_l$ in this base is decomposed, the decomposition coefficients denoted as $G_{lk}$ forming independent Gaussian random variables,
d) the coefficients $G_{lk}$ defining a vector $G_l$ with N components for each path l, and each vector $G_l$ is estimated using an iterative process based on an estimation-maximization (EM) algorithm based on a maximum a posteriori probability criterion.

In one particular embodiment, the iterative process is used initially taking account of the control symbols contained in the block and assumed to be known, which gives a first estimate for data symbols contained in the block, the said iterative process then taking account of all symbols in the block according to this first estimate, which can give a second estimate of the symbols in the block, and so on, until a satisfactory estimate is obtained for values of $G_l$, that are used for the demodulation.

DESCRIPTION OF PARTICULAR EMBODIMENTS

The following mathematical developments, like the figures, are applicable to the case in which symbols are multiplexed in time only, for simplification and notation reasons. The case in which the symbols are multiplexed in time and by code on components in quadrature is dealt with in a similar manner.

Figure 1:
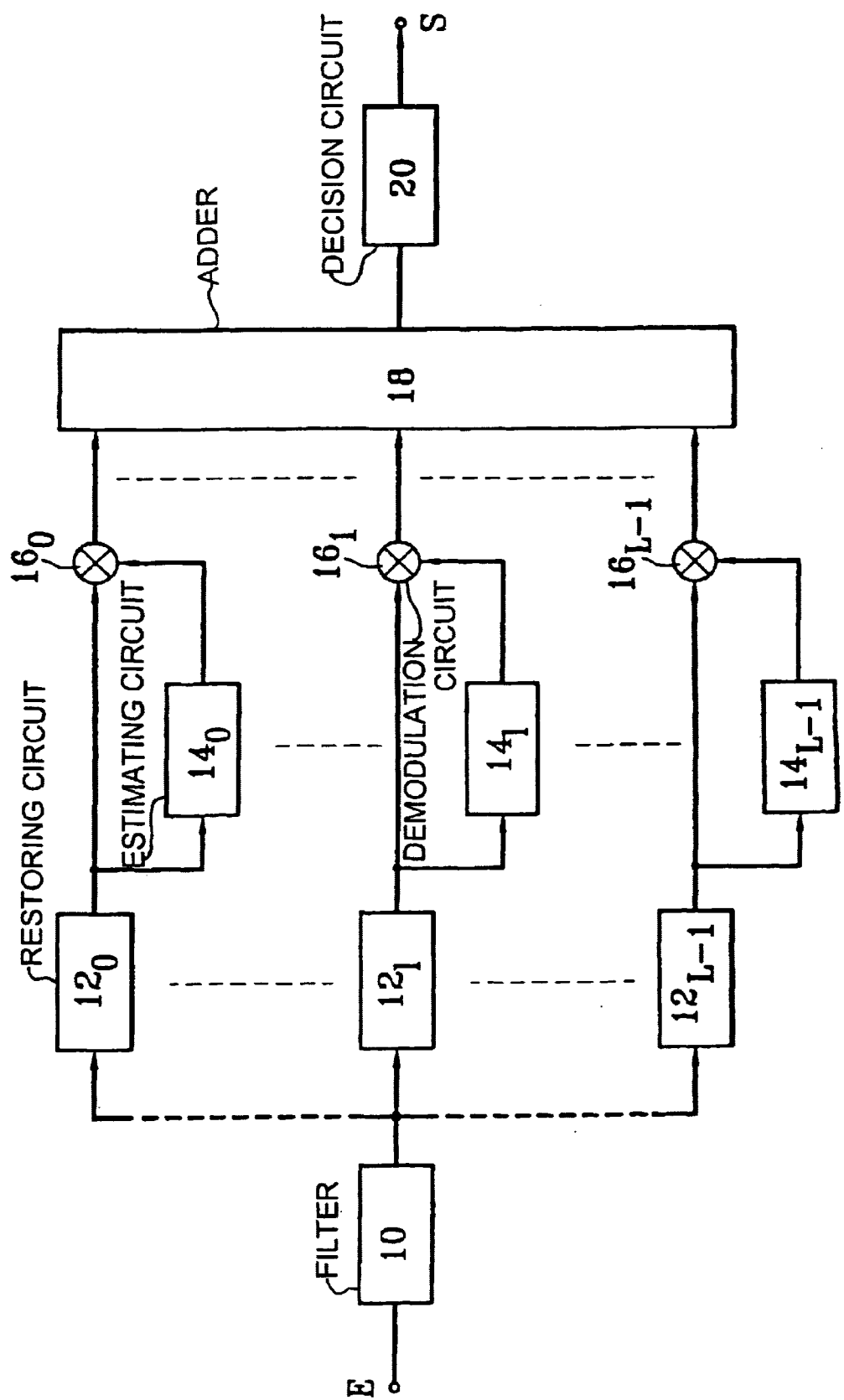
FIG. 1, already described, shows a known rake receiver.
Figure 2:
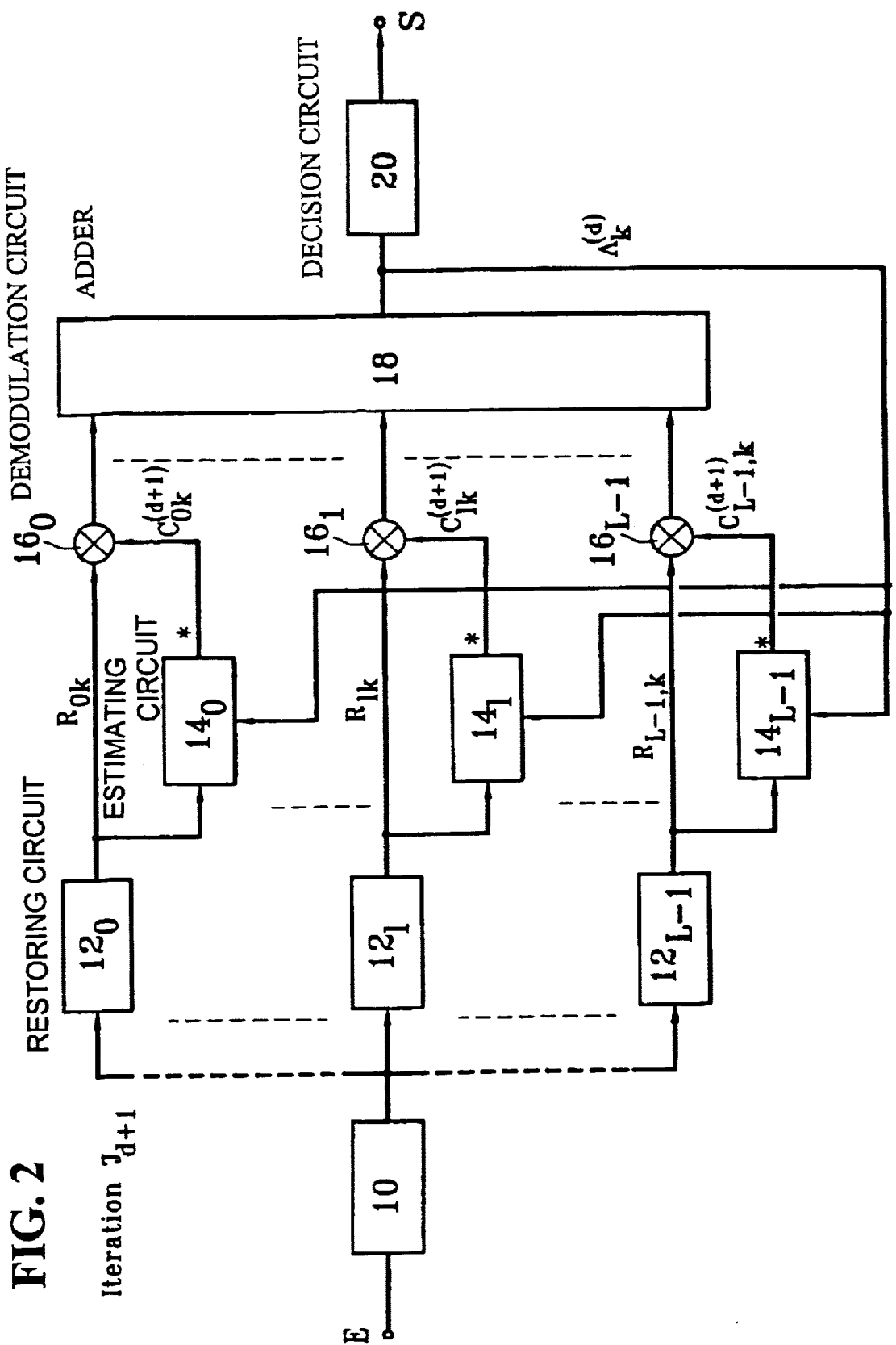
FIG. 2 illustrates the general structure of an iterative rake receiver according to the invention.

The receiver according to the invention searches for a representation of the multipath channel according to a criterion called the maximum a posteriori (MAP) probability criterion. This estimate requires knowledge of the emitted symbols, or at least their probability. In one particular embodiment, the receiver may use estimates present at the adder output. Therefore in this case, the output is looped back onto the various estimators as shown in FIG. 2. This figure shows that the output from the adder 18, that outputs a signal denoted $\Lambda_k$ (where k denotes the rank of the symbol being processed, this rank varying from 0 to N−1 as explained later) is looped back on estimators $14_0, \ldots 14_l, \ldots, 14_{L-1}$. But this loop back does not appear explicitly, as will become clear later.

The properties of the multipath channel are determined using a posteriori probabilities of some magnitudes, considering the signal $R_{lk}$ (t) output by each unspreading circuit. This calculation is made by decomposing the signal into components, ensuring that the components are not correlated. This is done using the KARHUNEN-LOEVE decomposition algorithm. The principle of this algorithm is briefly described below.

A random function of time z(t), with an average value equal to zero, has a correlation function denoted $\phi(t,\tau)$ equal to $$\frac{1}{2} E[z(t) \cdot z^*(\tau)]$$

where E is the mathematical expectancy. The function z(t) may be developed in series in the form:

$$z(t) = \sum_{n=1}^{\infty} z_n f_n(t)$$

where the values of $z_n$ are development coefficients and the values of $f_n(t)$ are orthonormal functions over a given interval 0, T.

Each coefficient $z_n$ may be obtained from the function z(t) and the eigenfunctions $f_n(t)$ using the relation:

$$Z_n = \int_0^T Z(t) f^*_n(t) dt$$

It is demonstrated that the orthonormal functions $f_n(t)$ are the eigenfunctions of the equation:

$$\int_{0T} \phi(t,\tau) f_n(\tau) d\tau = \lambda_n f_n(t)$$

where the $\lambda_m$ values are eigenvalues.

If the signal output by an unspreading circuit (matched filter or correlator) is denoted R(t), we have:

$$R(t) = C(t)A(t) + N(t)$$

where C(t) is a function that characterizes the path taken by the wave, A(t) is the emitted information and N(t) is additive Gaussian noise. In order to estimate each path, the function C(t) that characterizes it will be decomposed using the KARHUNEN-LOEVE algorithm. In reality, CDMA type radiocommunications use digital magnitudes, or samples, rather than continuous functions in time. The output signal from the unspreading circuit for tooth order l in the rake is in the form:

$$R_{lk} = C_{lk} A_k + N_{lk}$$

where k is the rank of the symbol, assumed to vary from 0 to N−1 if a block of N symbols is processed. For a given path, identified by the index l, the N components $C_{lk}$ form the N components of a vector $C_l$. This is the vector that will be decomposed using the KARHUNEN-LOEVE algorithm which in this case involves discrete summations instead of integrals. Therefore, we will talk about "eigenvectors" rather than "eigenfunctions", but the spirit of the decomposition remains the same.

Having mentioned these general aspects, the receiver and the process according to the invention will now be described in detail as follows, for the case in which a single power control period is considered.

Each power level, corresponding to one power control period, is composed of $N_D$ data symbols and $N_C$ control symbols, all modulated in phase (MDP2, MDP4, MDP8, . . . ). In the following, the total number of these symbols will be denoted N ($N=N_D+N_C$), data symbols will be denoted $a_0, a_1, \ldots, a_{ND-1}$ and control symbols will be denoted $a_{ND} \, a_{ND+1}, \ldots, a_{N-1}$.

These two categories of symbols may be spread using different spreading factors by means of finite pseudo-random sequences. Furthermore, they may be multiplexed either separately on in-phase and in-quadrature components of the modulated signal, or together in time. In the following, the relative position of each of these symbols in time with respect to the beginning of the corresponding power control period, will be. denoted $P_i$.

In general, control symbols are composed firstly of $N_p$ pilot symbols $a_{ND}$, $a_{ND+1}$, ..., $a_{ND-NP-1}$ known to the receiver and $N_C-N_P$ symbols $a_{ND+NP}$, $a_{ND+NP+1}$, ..., $a_{N-1}$ dedicated to power control on the reciprocal channel and the indication of the received data format.

During one given power control period, the emitted energy allocated to symbol $a_i$ will be denoted $E_i$. This energy is normally common to symbols in the same category, but it may differ in different categories. In this case, the energies assigned to the data and control symbols will be denoted $E_D$ and $E_C$ respectively.

The multipath channel seen by the emitted CDMA signals is composed of several paths which have or which could have temporal variations due to the Doppler effect. Each path is characterized by a given average power and a given Doppler power spectrum (DPS) that depend on the environment and the speed of the mobile. Furthermore, fading on each path may be of the Rayleigh type or the Rice type.

In general, Doppler power spectra with Rayleigh fading are either of the conventional type or the flat type. Conventional Doppler power spectra are encountered particularly in environments outside buildings, while flat Doppler power spectra are encountered particularly in environments inside buildings.

The Doppler channel spreading effect is denoted $B_D$, and the Bessel function of the first type of order 0 is denoted $J_0(.)$. The self-correlation function of an average power path $\phi(0)$ is then given by:

$$\phi(\tau)=\phi(0) J_0(\pi B_D \tau),$$

in the case of a conventional DPS, and by $$\phi(\tau)=\phi(0) \sin(\pi B_D \tau T)/\pi B_D \tau,$$

in the case of a flat DPS (Doppler power spectrum) The average power $\phi(0)$ varies from one path to another and therefore characterizes the intensity profile of paths.

As mentioned above, a rake receiver is composed of L teeth that can be used to follow the L paths with the highest power, and to constructively combine the contributions of these L paths. The number of paths used by a rake receiver is usually less than the real number of paths actually received. This number depends on the environment (external or internal) and the CDMA spreading factor. Typical values of 2 to 3 in internal environments and 4 to 8 in external environments are often used.

Let $R_{lk}$ be the correlator output signal from the $l^{th}$ tooth corresponding to the $K^{th}$ symbol $a_k$ transmitted during an arbitrary power control period. This signal may be in the form:

$$R_{lk}=C_{lk}a_k+N_{lk}$$

where $C_{lk}$ is the gain factor of the $l^{th}$ path of the receiver seen by the symbol $a_k$, and $N_{lk}$ is a complex noise that includes the thermal noise and the interference caused by multiple access of other mobiles. In order to simplify the analysis and design of the receiver, this noise is assumed to be Gaussian and decorrelated, and its variance is denoted $I_0$.

The gain factors for a given path are also assumed to be independent from each other. The reason for this is that two signals reaching the receiver with different delays have a good chance of not using the same paths and not meeting the same obstacles. Nevertheless, gain factors on a given path are usually correlated with each other. If $E[.]$ and $\phi_l(.)$ denote the mathematical expectancy operator and the continuous self-correlation function of the $l^{th}$ path respectively, then the discrete self-correlation function corresponding to this path is given by:

$$E[C_{li}C^*_{lj}]=\phi_l(P_i-P_j)$$

where $P_i$ and $P_j$ values identify the position in time of the symbols with respect to the flow of the power control period.

In general, the receiver has a vague idea of the value of the Doppler spread $B_D$ and of the shape of the Doppler power spectrum. Consequently, it adopts the representation of the least predicable multipath channel with a flat Doppler power spectrum, for which the Doppler spread is greater than or equal to the real spread. For simplification reasons, this upper limit of the spread will also be denoted $B_D$. It may be permanently fixed at the receiver as a function of its maximum authorized or actual speed. It may also be estimated by trial error, for example using symbols and/or the pilot channel.

During each power control period, the receiver needs the most precise possible estimate of gain factors $C_{lk}$ corresponding to data symbols, power control symbols and the format of the data received. Consequently, the receiver according to the invention is capable of taking account of the time correlation of gain factors of all paths combined by the receiver. It is also capable of taking account of all or part of the encoded structure of data and control symbols unknown to the receiver in order to improve this estimate. Finally, it can take account of all or some nearby power control period data and control symbols in order to optimize its estimate for a given power control period.

For simplification purposes, we will only describe the case of a multipath channel estimator using symbols received during a power control period exclusively, in order to estimate the corresponding channel output. The transposition operator will be denoted $(.)^T$ and the vector will be introduced:

$$R_l=R_{l0},R_{l1},\ldots,R_{l,N-1})^T$$

The components of this vector are the N samples received during the power control period to be processed and corresponding to the $l^{th}$ path selected by the receiver. The estimate of the multipath channel during this power control period is based entirely on these L vectors $R_0$, $R_1$, ..., $R_{L-1}$ of samples received.

The modulus operator is denoted $|.|$. Remember that the amplitude $|a_k|$ of $a_k$ that is equal to $\sqrt{E_k}$ depends not only on the power control period, but also on the index of the emitted symbol. In practice, this amplitude is the same for each symbol category.

The normalized transmitted symbols vector $$A=(A_0, A_1, \ldots, A_{N-1})^T$$

where $A_k=a_k/|a_k|$, is introduced in order to eliminate this dependence on the amplitude. The $k^{th}$ component of the $l^{th}$ vector of received samples can therefore be in the form:

$$R_{lk}=C_{lk}A_k+N_{lk}$$

where $C_{lk}$ is the $k^{th}$ component of the $$C_l=(|a_0|C_{l0},|a_1|C_{l1},\ldots,|a_{N-1}|C_{l,N-1})^T$$

vector of normalized gain factors corresponding to the $l^{th}$ path. This is the vector that is to be represented.

This representation is based on the KARHUNEN-LOEVE decomposition algorithm, and consists of expressing each of the L normalized vectors $C_l$, $l=0, 1, \ldots, L-1$ in the form:

$$C_l = \sum_{k=0}^{N-1} G_{lk} B_k,$$

where the $B_k$ values are the N normalized eigenvectors of the covariance matrix $F_l = E[C_l C_l^{*T}]$ of $C_l$ and the coefficients $G_{lk}$ are independent random Gaussian variables with zero average and variance equal to the eigenvalues of the matrix $F_l$, remembering that the index k varies from 0 to N−1.

It is assumed that the shapes of the Doppler power spectra of the paths are identical and therefore that the corresponding eigenvectors $B_k$ are also identical. If the exact characteristics of the multipath channel are known, the $(i,j)^{th}$ entry in the matrix $F_?$ will be:

$$F_{lij} = \phi_l(P_i - P_j)\sqrt{E_i E_j}.$$

In practice, neither the shape of the Doppler power spectrum and the corresponding Doppler spread, nor the powers at which the power control periods are emitted, are known precisely. The receiver can then adopt the flat DPS with width $B_D$ representing an upper limit to the real Doppler spread. Furthermore, it can assume that the average received power does not vary very much from one power control period to the next. In this more realistic case, the (i, j)$^{th}$ entry in the matrix $F_?$, given by $$F_{lij} = \phi_l(0)\sqrt{E_i E_j} \sin(\pi B_D(P_i - P_j))/\pi B_D(P_i - P_j)$$

no longer depends only on the upper limit of the adopted Doppler spread.

Also in practice, the receiver may have a bank of eigenvectors for each typical value of the upper limit of the Doppler spread in order to be able to better adapt to the terminal speed.

The channel estimator according to the invention makes an iterative estimate of the multipath channel with fading, using the MAP criterion. In its estimate, it may take account of the characteristics of the appropriate channel representation, and also the values of the pilot symbols and the encoded structure of unknown symbols (including data symbols).

The MAP estimate of $\hat{G}_l$, where l represents all values from 0 to N−1, of an implementation of $G_l$ of the multipath channel with fading, is the value $$\{\hat{G}\}_{l=0}^{L-1} = \arg\max P(\{G\}_l^{L-1}, \{R\}_l^{L-1})$$

which maximizes the a posteriori probability density $p(\{G_l\}_{l=0}^{L-1}, \{R_l\}_{l=0}^{L-1})$. According to the invention and using the EM algorithm, a solution as close as is desired to the exact solution can be obtained iteratively.

In the general case, the a posteriori probability density $p(\{G_l\}_{l=0}^{L-1}, \{R_l\}_{l=0}^{L-1})$ to be maximized has several global maxima that lead to an ambiguity in the estimate of the channel using the MAP criterion. This ambiguity may be eliminated by using pilot symbols known to the receiver. However, this is often insufficient, since this probability density has also local maxima that may be reached by the EM algorithm instead of the single global maximum. This problem can be solved by using pilot symbols to make a suitable determination of the initial conditions $G_l^{(0)}$, l=0, 1, . . . , L−1.

The EM algorithm reestimates the $\hat{G}_l$ vectors by induction, to guarantee monotonous growth of the conditional a posteriori probability density $p(\{G_l\}_{l=0}^{L-1}, \{R_l\}_{l=0}^{L-1})$.

Given the received vectors $R_l$, the EM algorithm begins by calculating initial conditions $G_l^{(0)}$ for the vectors $G_l$ starting from the received samples corresponding to the pilot symbols.

The set of possible values taken on by the $k^{th}$ symbol of a power control period is denoted as $S_k$, the set of indexes of pilot symbols of a power control period are denoted S, and the value taken on by the pilot symbol $A_k$ with an index within S (k∈S) is denoted as $D_k$. At this stage of the initialization of the EM algorithm, the receiver has no idea about the values of data symbols and therefore uses a uniform conditional probability density $P(A_k|\{R_l\}_0^{L-1}, \{G_l^{-1}\}_{l=0}^{L-1})$ for $A_k$ values that are not pilot symbols. If the modulation constellation has central symmetry (MPD2, MPD4, MPD8, . . . ) then the $n^{th}$ component of the initial condition of the $l^{th}$ path $G_l^{(0)}$ may be chosen to be equal to $$G_{ln}^{(0)} = W_{ln} \sum_{k \in S} D_k^* R_{lk} B_{nk}$$

where $W_{ln}$ is a weighting factor equal to $$W_{ln} = \frac{1}{1 + I_0/G_{ln}}$$

This factor depends on both $\Gamma_{ln}$, the $n^{th}$ eigenvalue in the matrix F (which depends on the average power $\phi_l(0)$ of the $l^{th}$ path and the Doppler spread $B_D$, and also the emitted energy associated with data and control symbols $E_D$ and $E_C$) and the noise variance $I_0$ including the thermal noise and interference by multiple access.

Still based on all received vectors $R_l$, the EM algorithm then results in an iterative calculation of the reestimate $G_l^{d+1}$ starting from the estimate $G_l^d$ making use of the expression:

$$G_{ln}^{(d+1)} = W_{ln} \left( \sum_{\substack{k=0 \\ k \in S}}^{N-1} \left[ \sum_{A \in S_k} A^* P(A | \{R_l\}_{l=0}^{L-1}, \{G_l^{(d)}\}_{l=0}^{L-1}) \right] R_{lk} B_{nk} + \sum_{k \in S} D_k^* R_{lk} B_{nk} \right)$$

defining the relation between the $n^{th}$ component of the $(d+1)^{th}$ reestimate of the $l^{th}$ vector of the appropriate representation of channel $G_l^{(d)}$.

The iterative estimate according to the invention of the adequate representation $G_l$ may be carried out a limited number D times such that the global estimate $G_l^{(0)}$ obtained guarantees an imperceptible degradation of receiver performances compared with the optimum solution $\hat{G}_l$.

Figure 3:
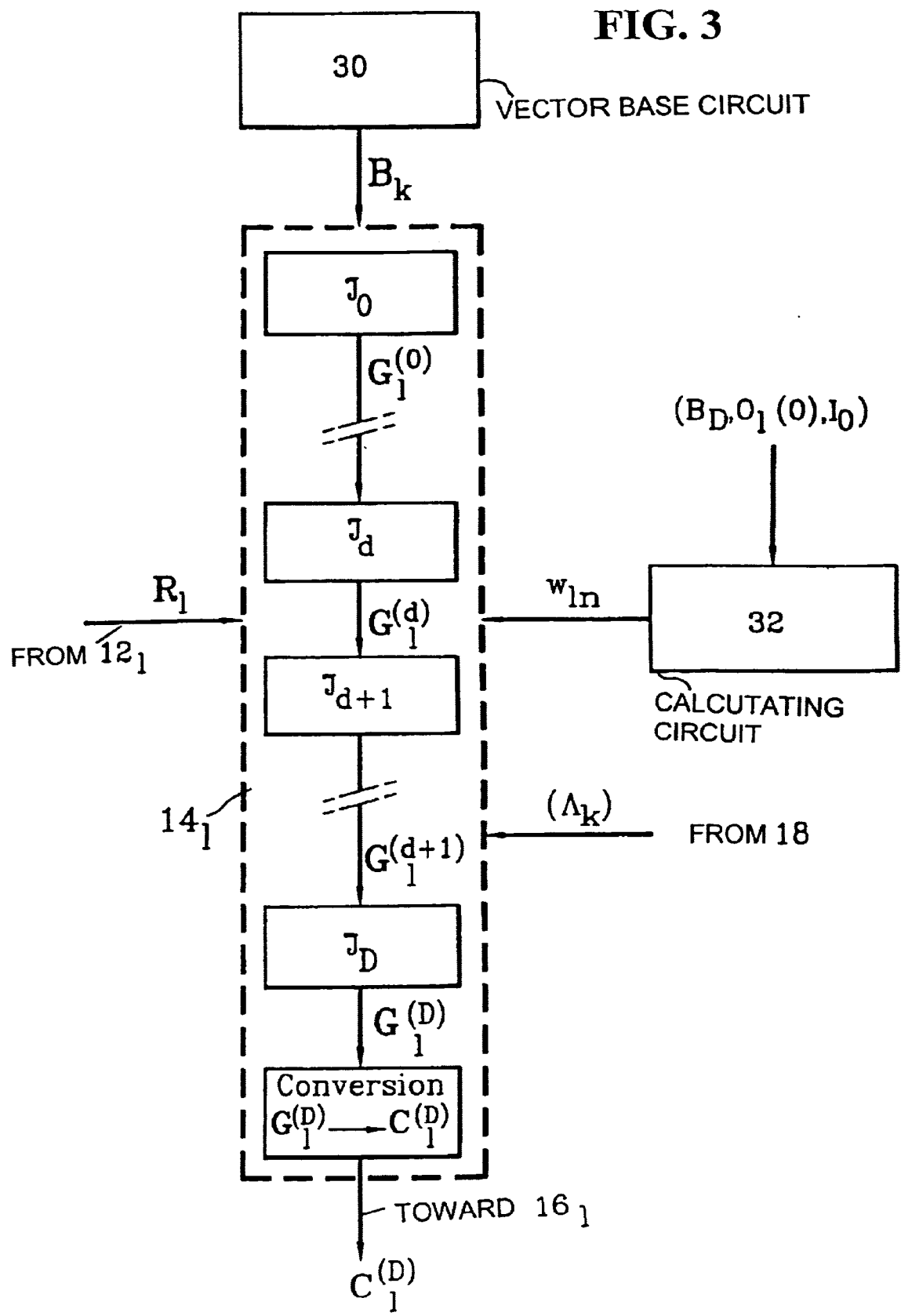
FIG. 3 shows the estimating and optimization block according to the maximum a posteriori probability criterion.

These operations are illustrated in FIG. 3, which shows the estimator rank P, namely 14$_l$, with means 30 defining the vectors base $B_k$ and means 32 for calculating weighting coefficients. The estimator 14$_l$, uses a first estimate represented symbolically by block $I_0$ that outputs the initial estimate $G_l^{(0)}$, and then an estimate of order d represented by block $I_d$ that outputs $G_0^{(d)}$, then an estimate d+1 represented by block $I_{d+1}$ that outputs $G_l^{(d+1)}$, and finally a final iteration of order D represented by block $I_D$ that outputs $G_l^{(D)}$.

Therefore, the receiver that has just been described comprises L circuits like the circuit shown as reference 14$_l$, in FIG. 3. Therefore, in order to refine its estimate of the $G_l^{(d)}$ channel, the circuit 14$_l$ must have probabilities $$P[A_k = A \mid \{R_l\}_{l=0}^{L-1}, \{G_l^{(d)}\}_{l=0}^{L-1}]$$

in other words the probability that the symbol $A_k$ will be equal to one among all the possible values, considering $R_l$ and $G_l$.

We have seen that D+1 iterations are carried out according to the invention in order to calculate $G^{(0)}, G^{(1)} \ldots, G^{(D)}$ in sequence. However, a problem arises for the first pass (d=0) since at this time there is no available value of $G_l$. Therefore it is impossible to calculate the probabilities defined above in a rigorous manner.

According to the invention, the pilot (or reference) symbols for which probabilities are known, are then used. For a pilot symbol the probability that $A_k$ will be equal to the value $D_k$ is equal to 1 (and the probability that $A_k$ is not equal to the value $D_k$ is equal to zero). Equally shared probabilities will be used for other symbols (for example ½ and ½ will be used for the two possible values for a binary symbol).

For subsequent iterations (d≠0), values of $G_l^{(d)}$ (and $R_?$) are available through knowledge of $\Lambda_k^{(d)}$ values outputs from the recombination of all demodulators defined by the expression $$\sum_{l=0}^{N-1} R_{lk} \left( \sum_{n=0}^{N-1} G_{ln}^{(d)*} B_{nk} \right),$$

and therefore the probabilities can be calculated as far as the $(D+1)^{th}$ iteration (d=D).

This process is rigorously applicable to cases in which symbols $A_k$ are information symbols not protected by a correction code, as shown below (or possibly protected by a code but which we do not want to use for reasons of simplicity). On the other hand, if the $A_k$ values are symbols protected by a correction code that we do want to use, an algorithm called the BAHL algorithm is used to obtain the probabilities $P(A_k=A \mid \{R_l\}_{l=0}^{L-1}, \{G_l\}_{l=0}^{L-1}$ necessary for iteration d+1 starting from iteration d. This algorithm carries out a complex operation, which is actually an improved demodulation process. Therefore, the demodulation operation carried out by demodulators $16_0, \ldots 16_l, \ldots, 16_{L-1}$ is no longer in the loop since another operation, more complex and more complete is already included in the iteration. In this case there is no longer any need to loop back on estimators at the output from adder 18.

BAHL's algorithm is described by L. R BAHL, J. COCKE, F. JELINEK and J. RAVIV in the article entitled "Optimal Decoding of Linear Codes for Minimizing Symbol Error Rate", published in IEEE Transactions on Information Theory, vol. IT-2°, March 1974.

In the special case of repetition encoding, the encoded structure may immediately be integrated into the explicit formula giving the $(d+1)^{th}$ iteration, thus avoiding the need for the BAHL algorithm.

In one special embodiment, the complexity of the channel estimator may be reduced without any significant loss of performance, by only selecting the eigenvectors corresponding to important eigenvalues, in the channel representation.

In another particular embodiment, the expression $G_{ln}^{(d+1)}$ may be further simplified in a special case of modulations MDP2, MDP4, etc. For modulation MDP2, the symbol $A_k$ with index k will be equal to the values in the set $S_k$ including the two values $+\sqrt{E_k}$ and $-\sqrt{E_k}$ and the general expression for $G_{ln}^{(d+1)}$ is transformed into $$G_{ln}^{(d+1)} = W_{ln} \left( \sum_{\substack{k=0 \\ k \in S}}^{N-1} \tanh\left[\frac{1}{I_0} \text{Re}\{\Lambda_k^{(d)}\}\right] R_{lk} B_{nk} + \sum_{k \in S} D_k^* R_{lk} B_{nk} \right)$$

where tanh[.] is the hyperbolic tangent function and $\Re\{.\}$ is the "real part" function. The arguments of the $\Re\{.\}$ operator are naturally supplied by the receiver during each iteration in the estimating algorithm. At the end of the iterative process (as we will see below), these arguments will be supplied directly by the receiver to an encoder (if any) using weighted decoding at the input.

The complexity of the channel estimator may be further reduced if one of the following clipping functions is used:

$$\Phi_0(x) = \begin{cases} x & \text{if } -1 \leq x \leq 1 \\ \text{sign of } x & \text{elsewhere} \end{cases}$$

or $$\Phi_1(x) = \begin{cases} 0 & \text{if } -1/2 \leq x \leq 1/2 \\ \text{sign of } x & \text{elsewhere} \end{cases}$$

or $$\Phi_2(x) = \text{sign of } x$$

instead of the hyperbolic tangent function.

If all steps in the EM algorithm are to be executed correctly, the receiver must have an upper limit $B_D$ for real Doppler spread, and an estimate of the noise variance $I_0$ and the individual power of each selected path $\Phi_l(0)$ If the receiver has a bank of eigenvectors for different typical values of the Doppler spread upper limit $B_D$, it can supply adequate base vectors $B_k$ as a function of the upper limit of the Doppler spread, and therefore the variable speed of the terminal.

If the upper limit of the Doppler spread is not updated as a function of the real speed of the terminal, a unique value will be assigned to it and the receiver only outputs the corresponding base vectors.

Similarly, due to the quantities mentioned above, the receiver can calculate and output the necessary weighting.

Having produced a $D^{th}$ estimate $G_l^{(D)}$, this final estimate is used as a representation of the channel and this representation is denoted $\hat{G}_l$. For each symbol of rank k, the demodulator $16_?$ forms the product of $R_{lk}$ by the complex conjugated quantity of $\hat{C}_{lk}$, namely $C^*_{lk}$, and the adder 18 forms the sum of all these contributions from L paths and outputs a final signal $\Lambda_k^{(D)}$ defined by:

$$\Lambda_k^{(D)} = \sum_{l=0}^{L-1} R_{lk} G_{lk}^*$$

If the values of $G^*_{lk}$ are expressed as a function of the basic vectors, we get $$\Lambda_k^{(D)} = \sum_{l=0}^{L-1} R_{lk} \left( \sum_{n=0}^{N-1} \hat{G}_{ln}^* B_{nk} \right).$$

The $\Lambda_k^{(D)}$ signals may be used by a Viterbi detector/decoder to retrieve unknown symbols (data) transmitted during a power control period, when encoding was applied to protect the data.

For MDP2 demodulation, the real parts of the $\Lambda_k^{(D)}$ signals are sufficient for decoding and act as weighted outputs.

Furthermore, for an uncoded MDP2 modulation with unknown symbols taking on the values $+\sqrt{E_k}$ and $-\sqrt{E_k}$ with equal probabilities, the decision on the symbol $A_k$ is simply given by $$A_k = \text{sign of } \Re e\{\Lambda_k^{(D)}\}$$

The invention that has been described above may be implemented regardless of the distribution of reference symbols. These reference symbols may be grouped or distributed in any manner. In particular, this invention can be used with a particular distribution as described and claimed in the French patent application deposited by this applicant on the same day as this patent application, and entitled "CDMA digital communication processes with distribution of reference symbols".

Operation of the receiver according to the invention has been simulated in service for the 8 kb/s channel on the up link of the UMTS's CDMA system. Data and control symbols are multiplexed on components of the transmitted modulated signal, in phase (I) and in quadrature (Q) respectively.

The control symbol spreading factor was twice the data symbol spreading factor. The duration of one power control period was 0.625 ms, and contained $N_D$=20 data symbols with period $T_D$=31.25 $\mu$s and $N_C$=10 control symbols with period $T_C$=62.5 $\mu$s. The time positions of the control symbols are given by:

$$P_i = (i+\tfrac{1}{2}) T_D, \ i=0, 1, \ldots, N_D-1$$

for data symbols, and by $$p_i = (i-N_D+\tfrac{1}{2}) T_C, \ i=N_D+1, \ldots, N-1$$

for control symbols. Control symbols included $N_p$=6 pilot symbols assumed to be grouped at the beginning of each power control period. Furthermore, the average power of the data symbols was assumed to be twice the average power of control symbols. Therefore the average received energy $\overline{E}$ is identical for all received symbols and satisfies the equation $$\overline{E} = \left( \sum_{l=0}^{L-1} f_l(0) \right) E_k, \ k = 0, 1, \ldots, N-1.$$

The terminal is assumed to move at a speed of 500 km/h and uses a carrier frequency of 1.92 GHz. The Doppler spread corresponding to these choices is 1.778 kHz. The channel is assumed to have L=3 paths with equal average power.

The performances of a receiver according to the invention and satisfying these assumptions were compared with the performances of two conventional receivers used in CDMA receivers. The first uses the estimating algorithm based on averaging, which compensates for the modulation applied to received samples corresponding to pilot symbols, and uses the average of these values to estimate the multipath channel. The second uses the linear estimating algorithm that also compensates modulation of pilot symbol samples, but carries out linear interpolation and/or extrapolation of the channel using the minimum mean square error (MMSE) criterion.

The comparison is made by the variation in the unprocessed binary error rate (BER) (ignoring possible error correction encoding) for distributed or grouped pilot symbols, using the three proposed channel estimating algorithms (according to the invention, by averaging or by linear estimate).

Figure 4:
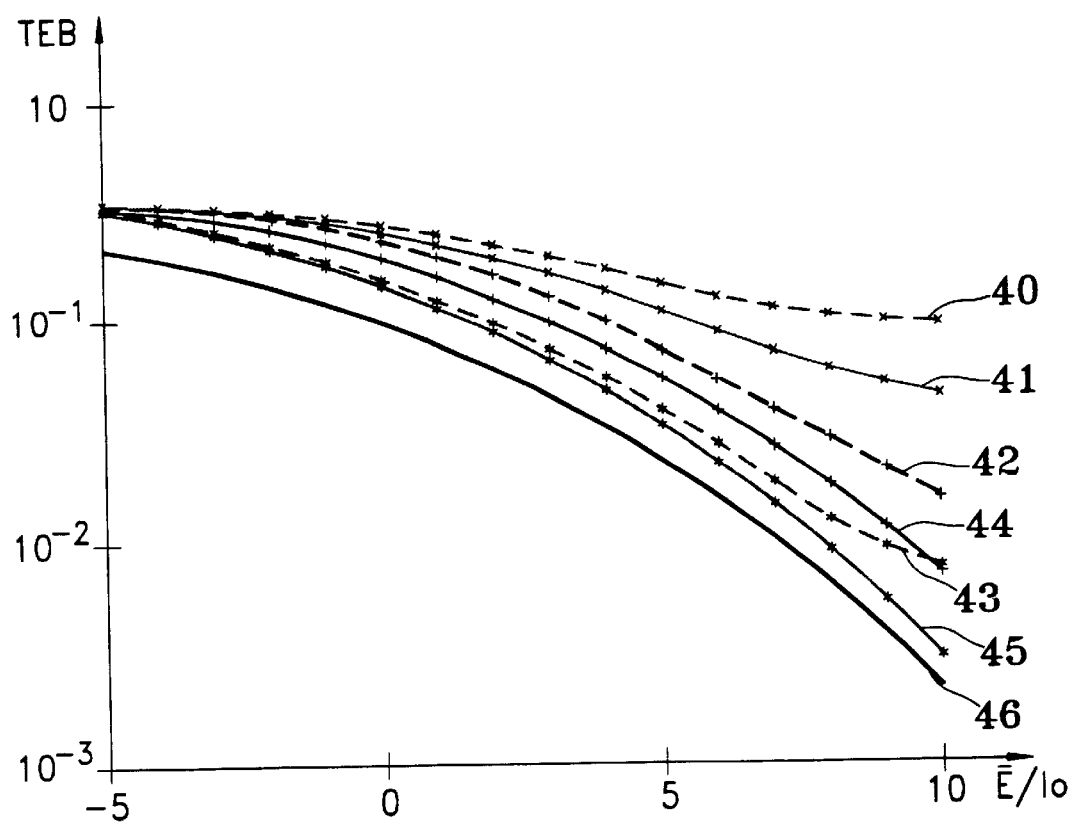
FIG. 4 compares the performances of a receiver according to the invention with two conventional rake receivers, giving the binary error rate as a function of the $\overline{E}/I_0$ ratio, where $I_0$ is the spectral power due to thermal noise and interference due to multiple accesses, and $\overline{E}$ is the average energy per received symbol.
Figure 5:
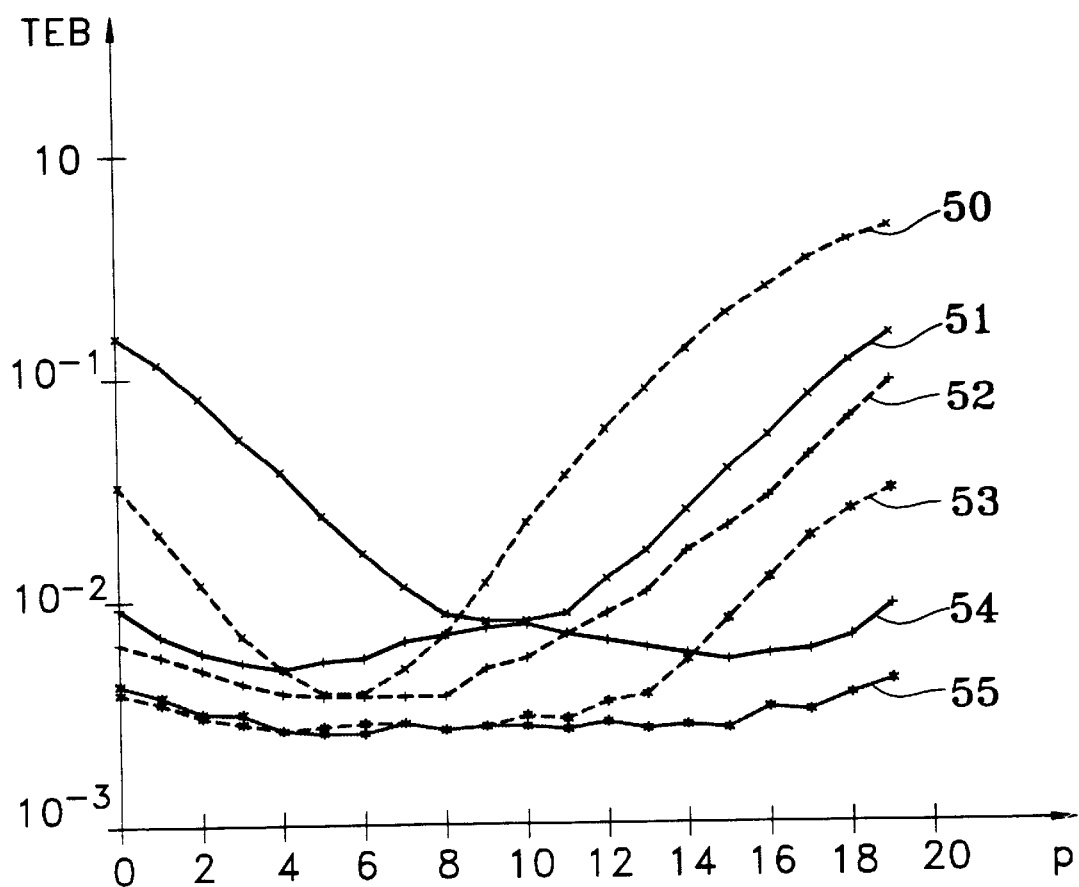
FIG. 5 compares the performances of the receiver according to the invention with two conventional receivers, giving the binary error rate as a function of the position of data symbols in a power control period for $\overline{E}/I_0$ equal to 10 dB.

FIG. 4 shows the binary error rate as a function of $\overline{E}I_0$ (the ratio between the average energy received per symbol and the noise level), and in FIG. 5, the same rate is shown as a function of the position of data symbols within a power control period for $\overline{E}/I_0$=10 dB. The references on the curves in these two figures correspond to the following characteristics:

40, 50: estimate by averaging, grouped pilot symbols,
41, 51: estimate by averaging, distributed pilot symbols,
42, 52: linear estimate, grouped pilot symbols,
43, 53: estimate according to the invention, grouped pilot symbols,
44, 54: linear estimate, distributed pilot symbols,
45, 55: estimate according to the invention, distributed pilot symbols,
46: theoretical curve, perfectly known channel.

These results show that the receiver according to the invention always provides better performances than either of the other two conventional receivers. The two curves closest to the theoretical curve correspond to the invention.

For example, for a gross BER equal to $2.10^{-2}$ and grouped pilot symbols, the receiver according to the invention guarantees a gain in $\overline{E}I_0$ of the order of 3 dB compared with the best conventional receivers.

What is claimed is:

1. A CDMA radiocommunication signals receiver for receiving signals obtained from spectrum symbols spread using pseudo-random sequences and having been propagated along a number of paths, said receiver comprising:

means for restoring L unspread signals for each symbol, corresponding to L different paths;

means for calculating L estimates of the L different paths;

demodulation means for processing each of the L unspread signals using the corresponding L estimates to obtain L path contributions;

an adder for forming a sum of said L path contributions and for outputting an estimate of a received symbol;

a decision circuit for making a decision about a value of the received symbol based on a value of the estimate of the received symbol output by the adder, wherein the receiver processes blocks of N symbols, each block comprising data symbols and control symbols, each symbol being identified by a rank k that it occupies in the block, where k varies from 0 to N−1, for each path identified by an index l, where l varies from 0 to L−1, and for each block, the receiver considers a vector $C_l$ with N components that characterizes the path during the block, the receiver further comprises means for defining a vector base $B_K$, vectors of the vector base $B_K$ being N eigenvectors of the matrix $E[C_l C_l^{*T}]$, each vector $C_l$ being decomposed in said vector base $B_K$, where decomposition coefficients denoted $G_{lK}$ form independent random Gaussian variables, and wherein coefficients $G_{lK}$, define a vector $G_l$ with N components for each path l, and the calculating means estimates each vector $G_l$, using an iterative process based on EM estimation-maximization algorithm based on a maximum a posteriori probability criterion.

2. The receiver according to claim 1, wherein an output from the adder is looped back onto the calculating means, and the calculating means are initially used based on control symbols contained in the block and assumed to be known, which gives a first estimate for data symbols contained in the block at the output from the adder, and the calculating means then uses estimated symbols present at the output from the adder and outputs a quasi-optimal value of the vector $G_l$, after a final iteration.

3. A process for receiving CDMA radiocommunication signals obtained from spectrum symbols spread using pseudo-random sequences and having been propagated along a number of paths, said process comprising:

restoring for each symbol, L unspread signals corresponding to L different paths;

calculating L estimates of the L different paths;

demodulating each of the L unspread signals using the corresponding L estimates to obtain L contributions of the paths;

forming a sum of said L contributions, which gives an estimate of a received symbol;

making a decision about a value of the received symbol based on a value of the estimate of the received symbol;

processing blocks of N symbols, each block comprising data symbols and control symbols, each symbol being identified by a rank k that it occupies within the block, where k varies from 0 to N−1;

considering for each path, identified by an index l where l varies from 0 to L−1, and for each block, a vector $C_l$ with N components, which characterizes the path during the block; and considering a matrix $E[C_l C_l^{*T}]$ which has N eigenvectors denoted $B_k$ using said N eigenvectors $B_k$ as a base, and decomposing each vector $C_l$ in said base, where decomposition coefficients denoted $G_{lk}$ form independent Gaussian random variables, wherein the decomposition coefficients $G_{lk}$ define a vector $G_l$ with N components for each path, and each vector $G_l$ is estimated using an iterative process based on an estimation-maximization (EM) algorithm based on a maximum a posteriori probability criterion.

4. The process according to claim 3, wherein the iterative process is initially used based on control symbols contained in the block and assumed to be known, which gives a first estimate for data symbols contained in the block, and the iterative process then takes into account all symbols in the block according to said first estimate, which gives a second estimate of the symbols in the block, until a satisfactory estimate is obtained for values of $G_l$, that are used for the demodulation process.

5. A CDMA radiocommunication signals receiver for receiving signals obtained from spectrum symbols spread using pseudo-random sequences and having been propagated along a number of paths, said receiver comprising:

a filter configured to restore L unspread signals for each symbol, corresponding to L different paths;

a calculating circuit configured to calculate L estimates of the L different paths;

a demodulator configured to process each of the L unspread signals using the corresponding L estimates to obtain L path contributions;

an adder configured to form a sum of said L path contributions and for outputting an estimate of a received symbol;

a decision circuit configured to make a decision about a value of the received symbol based on a value of the estimate of the received symbol output by the adder, wherein the receiver processes blocks of N symbols, each block comprising data symbols and control symbols, each symbol being identified by a rank k that it occupies in the block, where k varies from 0 to N−1, for each path identified by an index l, where l varies from 0 to L−1, and for each block, the receiver considers a vector $C_l$ with N components that characterizes the path during the block, the receiver defines a vector base $B_K$, vectors of the vector base $B_K$ being N eigenvectors of the matrix E $[C_l C_l^{*T}]$, each vector $C_l$ being decomposed in said vector base, where decomposition coefficients denoted $G_{lK}$ form independent random Gaussian variables, and wherein coefficients $G_{lK}$, define a vector $G_l$ with N components for each path l, and the calculating circuit estimates each vector $G_l$, using an iterative process based on EM estimation-maximization algorithm based on a maximum a posteriori probability criterion.

6. The receiver according to claim 1, wherein an output from the adder is looped back onto the calculating circuit, and the calculating circuit is initially used based on control symbols contained in the block and assumed to be known, which gives a first estimate for data symbols contained in the block at the output from the adder, and the calculating circuit then uses estimated symbols present at the output from the adder and outputs a quasi-optimal value of the vector $G_l$, after a final iteration.

* * * * *